US000001961H

(19) United States

(12) Statutory Invention Registration

Runyon

(10) Reg. No.: US H1961 H

(43) Published: Jun. 5, 2001

(54) DIRECTIONAL REFERENCE FOR TRAILING LOCOMOTIVES AND RAILROAD CARS

(75) Inventor: Robert S. Runyon, Roanoke, VA (US)

(73) Assignee: Norfolk Southern Corporation, Norfolk, VA (US)

(21) Appl. No.: 09/285,762

(22) Filed: Apr. 5, 1999

(51) Int. Cl.[7] ..... B61D 49/00

(52) U.S. Cl. ..... 105/61; 105/26.05

(58) Field of Search ..... 105/26.05, 49, 105/61

(56) References Cited

U.S. PATENT DOCUMENTS 3,868,909 * 3/1975 Pelabon ..... 105/1 R 5,907,193 * 5/1999 Lumbis ..... 105/61

* cited by examiner

*Primary Examiner*—Michael J. Carone

(74) *Attorney, Agent, or Firm*—John P. DeLuca; Watson Cole Grindle Watson, P.L.L.C.

(57) ABSTRACT

A universal directional reference for trailing locomotives and railroad cars employs a two wire mating connector for each end of the car or locomotive, each wire having a male contact at one end and a female contact at the opposite end and in a sense opposite to the other wire. A positive polarity established on one conductor having its male contact at the leading end of the controlling locomotive causes the same polarity to appear on the female contact at the rear end of said locomotive which is connected to the male contact of the next car or locomotive thereby sustaining the pattern throughout the train. Reverse orientation of any trailing unit automatically swaps the internal polarity of its trainline wires to compensate for the otherwise reverse direction of travel.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIRECTIONAL REFERENCE FOR TRAILING LOCOMOTIVES AND RAILROAD CARS

BACKGROUND OF THE INVENTION

Trailing locomotives in a multiple-unit consist are controlled from the lead unit by means of a known system using twenty seven wires extending through each locomotive unit. Connections are made to each adjacent unit through a twenty seven conductor jumper cable. Two of the wires used for directional setup are designated as forward and reverse. These are swapped at one end of the locomotive and swapped back to normal in the jumper cable. With this arrangement, any locomotive oriented in the reverse position will receive its forward or reverse signal in the opposite wire of the pair, and thus establish a direction of travel identical with the lead locomotive.

Slave locomotives, situated elsewhere in the train, are connected to each other in the above manner but must receive their commands from the controlling unit by radio. Even with error-free communication, the forward and reverse commands will arrive at the slave consist with ambiguous meaning because of the unknown orientation of these units relative to the controlling unit. Presently the slave consist must be set up manually to provide a directional reference.

The rail industry is now taking interest in the use of an electrically controlled pneumatic (ECP) train brake system. In its present form ECP employs a two-conductor cable trainline extending through the length of each car and locomotive for transmission of both digital control signals and DC power from the controlling locomotive to energize the electric devices on each car. The Association of American Railroads (AAR) has generally specified a standard inter-car connector for this purpose consisting of both a male and female component, such that, trainline connectors on adjacent cars will mate properly regardless of car orientation. An effort is ongoing to expand the ECP specification whereby the two-conductor trainline cable can serve as a platform for control of slave locomotives in lieu of radio. If fully implemented, this method could supplant the present twenty seven conductor trainline in all locomotives including those in the head-end consist. However, this would require an alternative directional reference for trailing units at least as automatic and foolproof as the present swapped wire arrangement.

SUMMARY OF THE INVENTION

The invention is based upon the discovery that an electrical trainline as now specified for ECP can be made in include a directional reference throughout the train. The polarity of the DC trainline supply voltage provides the directional reference provided that each conductor is always connected from the female contact of one connector to the male contact of the connector at the opposite end and vice-versa. Because mating contacts will only connect male to female, each connected trainline wire will thus have identical contacts at the same end of every locomotive and car with respect to its orientation in the train. Standard orientation is defined by the polarity of the DC trainline supply introduced at the controlling locomotive.

In an exemplary embodiment, a positive polarity is arbitrarily established on the conductor having its male contact at the leading end of the controlling locomotive. With the electrical trainline connected as described, the same positive polarity will appear on the female contact at the rear end of the controlling locomotive. This, in turn, connects to the male contact at the leading end of the next locomotive or car, thereby sustaining the pattern throughout the train. Each trailing locomotive, by design, responds to a directional command as indicated by the polarity of its internal trainline wires. However, the orientation of the trailing locomotive does not affect the connection pattern. Reversing the orientation of a trailing unit automatically swaps the internal polarity of its trainline wires to compensate for the otherwise reversed direction of travel. This arrangement provides an absolute directional reference which must be defined manually on the controlling locomotive. Once defined, however, the pattern will extend through the entire train and can be used for automatic setup of sanding, trailing headlights, and any optional features dependent on orientation.

A variation of the above method would avoid the need for manual setup by using trainline polarity to directly control direction of movement. For example, forward operation could be specified by positive polarity on the trainline conductor whose male contact is at the leading end of the locomotive. This arrangement functionally emulates the conventional swapped-wire directional control but, like the latter, does not define an absolute reference for orientation.

BRIEF DESCRIPTION OF THE DRAWINGS

The invention will now be described with reference to the accompanying drawings, wherein.

DESCRIPTION OF THE INVENTION

The invention is directed to a method and apparatus for maintaining directional reference for trailing locomotives and railroad cars. The invention may be universally applied to any trainline wherein the convention defined herein is maintained.

Figure 1:
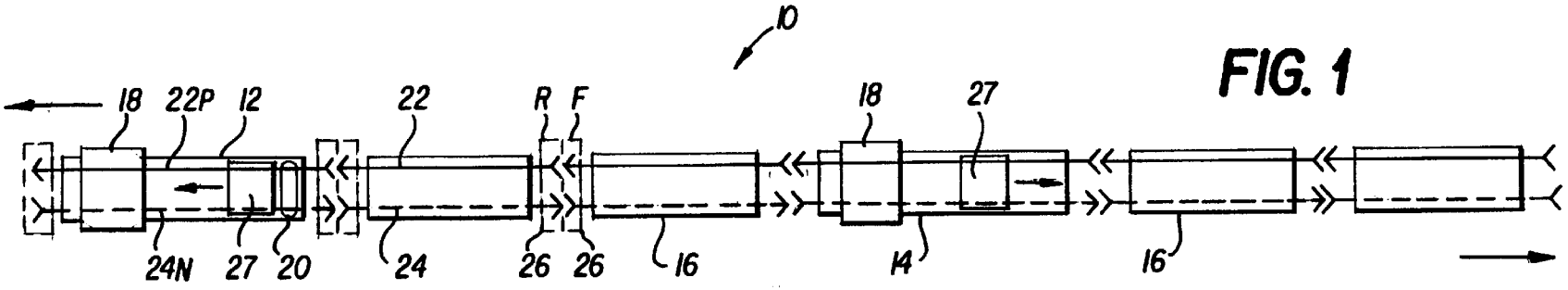
FIG. 1 is a schematic illustration of a train equipped with a two conductor electric trainline and whose consist includes two locomotives both oriented in the same direction.

The arrangement according to the invention presupposes certain known conditions. As illustrated in FIG. 1 a train 10 includes two locomotives comprising locomotive 12 in the leading position and locomotive 14 in a trailing or slave position. One or more cars 16 are in the train 10. Both locomotives 12 and 14 are oriented in the forward direction to the left in the drawing. Each locomotive has a polarized DC power supply 18 as shown in FIG. 1A. According to the invention, each locomotive or car in the train has a pair of trainline wires 20 which run throughout its length. One wire 22 shown in solid line is designated as the positive (P) wire and one wire 24 shown in dashed line is designated as the negative (N) wire. Each of the wires 20 is terminated in identical universal mating forward and rear connectors 26 (F) and 26 (R) as shown. Each connector has a male (M) and female (F) contact as illustrated as an arrow head and arrow tail respectively. Accordingly, any car can be connected to any other car simply by means of interconnecting the respective connectors 26 (R) and 26 (F) at the rear and forward end of any two adjacent cars as shown. Like wise, if a car or locomotive is reversed, the male and female connect, but the conductors 22 and 24 become swapped.

Figure 1B:
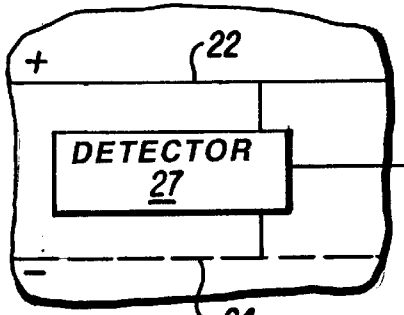
FIG. 1B is an enlarged schematic of the detector connections to the trainline in each locomotive.
Figure 1A:
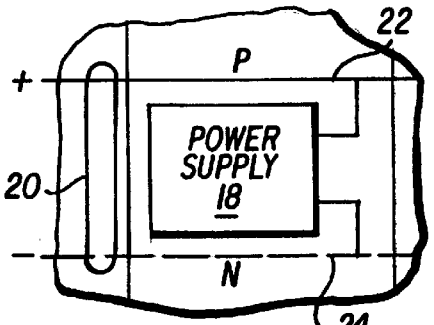
FIG. 1A is an enlarged schematic of the power supply connections to the trainline in the leading (controlling) locomotive.

According to an exemplary embodiment of the invention, each locomotive 12 and 14 has a detector 27 which is responsively coupled to the train line wires 22 and 24 as shown in FIG. 1B. The detector 27 is operative to establish rotational direction of the locomotive traction motors (not shown). In the embodiment illustrated, the detector 27 is responsive to the polarity of the wires 22 and 24 and is also responsive to coded input signals carried thereon. Polarity tells the locomotive how it is orientated, i.e. facing forward or facing rearwardly. The coded signals provide a direction command. If the detector 27 senses that the locomotive 14 is facing forward, it interprets a forward coded signal to direct the locomotive to move in that direction. However, if the detector 27 senses a reverse polarity, (i.e. it is orientated facing rearwardly), a coded signal indicating a move in the forward direction is interpreted as a reverse command. In the arrangement described, trainline polarity must be set up manually on the controlling locomotive 12.

According to the exemplary embodiment, the leading locomotive 12 is the control locomotive and one of the wires 22 is manually polarized with a positive (P) signal. When the trailing locomotive 14 is connected through intervening cars 16 to the control locomotive 12, the connector F connects wire 22 on the trailing locomotive 14 with the same wire 22 on the leading locomotive 12. Likewise, the connector 26 F connects the wire 24 on the trailing locomotive 14 with the wire 24 on the leading locomotive 12. A positive (P) polarity on the front male connector 26 F and wire 22 in locomotive 12 is interpreted as forward orientation. That polarity is carried back to the trailing locomotive 14 in the same way. That is, the male connector on the forward connector 26 F of the trailing locomotive 14 is likewise positive. A negative polarity N on the female contact of the front connector 26 F of the leading locomotive 12 is carried back to the trailing locomotive 16 on the dashed line 24.

Figure 2:
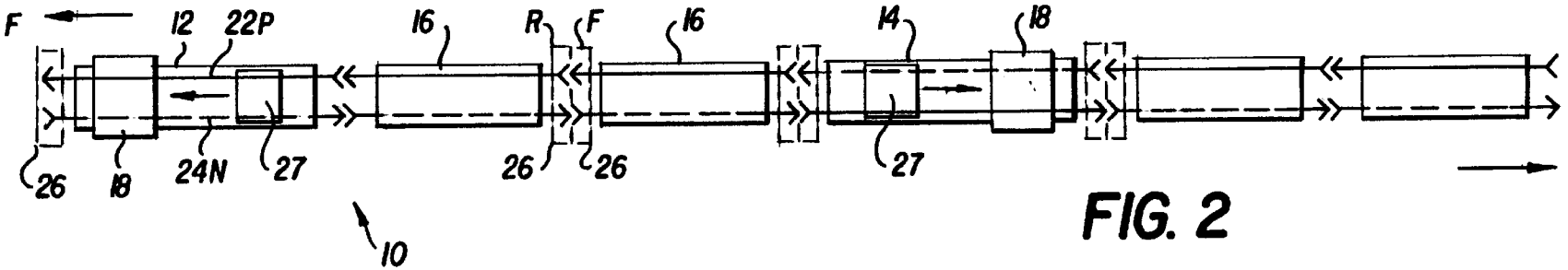
FIG. 2 is a schematic illustration of the train of FIG. 1 with the trailing or slave locomotive having reversed orientation.

FIG. 2 illustrates an exemplary embodiment of the invention in which the leading locomotive 12 is oriented in a manner similar to the arrangement of FIG. 1. However, the trailing locomotive 14 situated in the train is facing in the reverse direction. In the same way as illustrated in FIG. 1, wire 22 carries a positive polarity P and the male contact of the forward connector 26 F is positively polarized. That polarity is carried back through the entire trainline by a female/male contact between each of the cars. In the arrangement illustrated in FIG. 2 a positive polarity on wire 22 of the control locomotive 12 represents forward orientation (to the left). The positive polarity is carried back to the male contact on the forward connector 26 F of the trailing locomotive 14. However, because the trailing locomotive 14 is facing in a reverse direction, the positive polarity is swapped to wire 24. As a result, the response of the trailing locomotive is swapped. In other words, the trailing locomotive 14 interprets the positive polarity on wire 24 as an instruction to move in the direction opposite that commanded from the leading locomotive, which of course is consistent with the actual movement direction of the lead locomotive 12.

In another embodiment of the invention, the need for manual set up is avoided by using the train line polarity to directly control the direction of movement. For example, in FIG. 1, forward operation could be specified by positive polarity on the train line conductor 22 whose male contact 26 is at the leading end of the locomotive 12.

In the latter embodiment detector 27 in locomotive 14, FIG. 1 is responsive to the polarity of the trainline wires 22 and 24 as a directional signal. In other words, if the detector 27 senses that the wire 22 is positive, the detector causes the locomotive traction motors to move the locomotive in the direction of the positive male contact in FIG. 1, i.e. to the left. In the arrangement of FIG. 2, the detector 27 on the trailing locomotive 14 senses the positive polarity on line 24. The detector 27 interprets this to mean that the forward direction is in the direction of the positive polarity male contact, i.e. also to the left in FIG. 2. In this embodiment, the detector 27 relies on the polarity of the trainline wires to provide a directional command, whereas in the first described embodiment, the directional command is in the form of a coded signal which is interpreted in accordance with the polarity of the trainline wires.

Figure 3A:
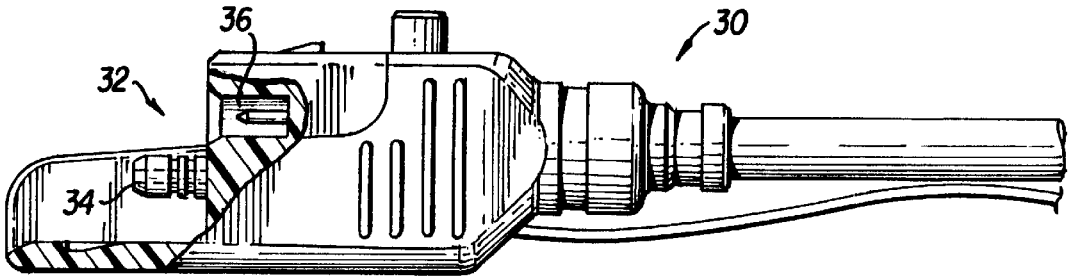
FIGS. 3A and 3B are illustrations of an exemplary connector arrangement wherein consistent polarity is maintained in accordance with the invention.
Figure 3B:
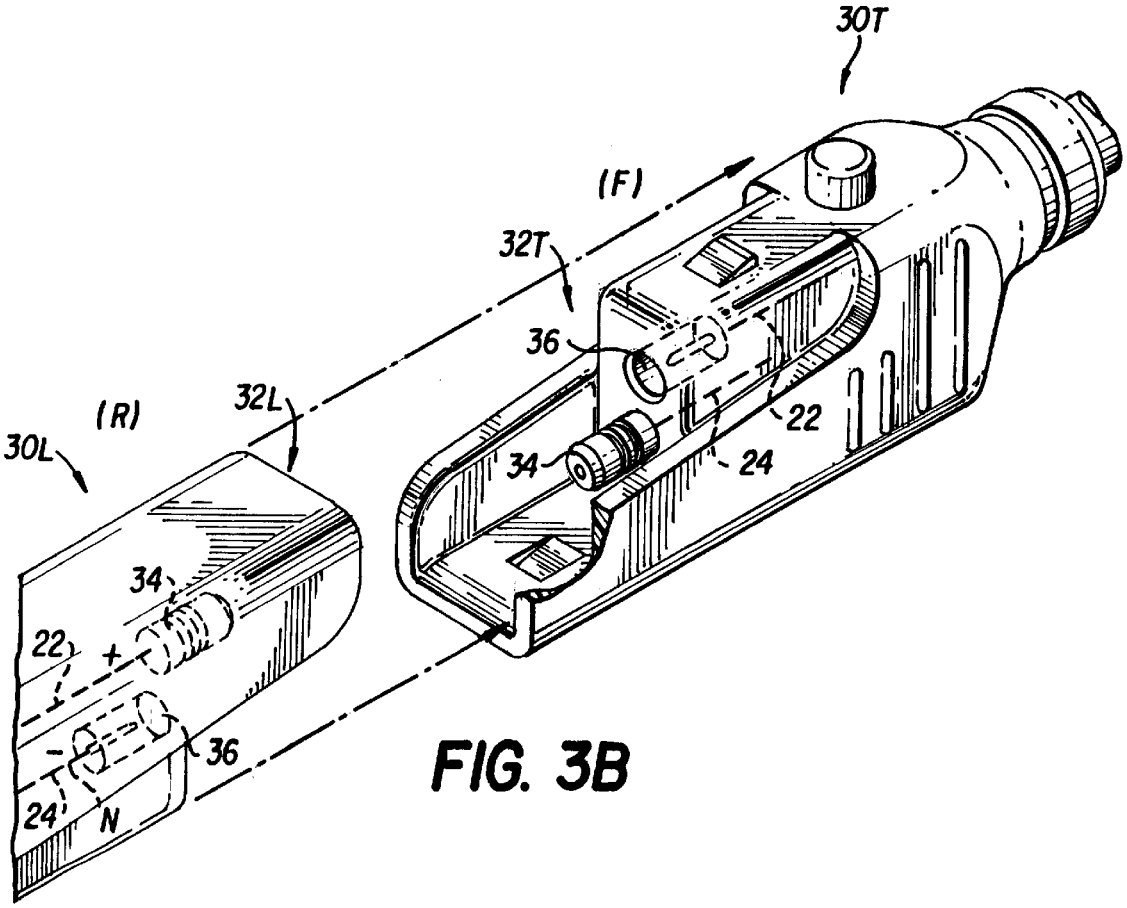

FIGS. 3A and 3B illustrate an exemplary universal mating connector 30 arrangement which may be employed to implement the invention. One connector 30 in FIG. 3A is oriented with a mating end 32 with male and female contacts 34 and 36 facing the forward direction (to the left). In FIG. 3B, respective leading and trailing connections 30L and 30T are adapted to mate the corresponding mating ends 32L and 32T. That is, with the male contact 34 of the forward end F of the trailing connector 32T polarized positive, the female terminal 34 at the rear end R of the leading connector 32L is likewise positively polarized. The adjacent connector has its male contact 34 coupled to the female contact 36 as shown. As a result, the female contact 36 at the forward end (F) of the leading connector 30L is negatively polarized and this polarity is carried back to the male contact 34 of the trailing connector 32T as illustrated.

FIG. 3B also illustrates that the connectors 30 can be reversed. It should be readily apparent that the physical connection between the rear connector and adjacent forward connector is universal, but when the car or locomotive orientation is changed, the wires 22 and 24 are swapped.

In accordance with an exemplary embodiment in the invention, if a positive polarity is established on the conductor having its male contact at the leading end of the controlling locomotive, the same positive polarity will appear on the female contact at the rear end of the same locomotive. This in turn, connects the male contact to the leading end of the next locomotive or car thereby sustaining the pattern throughout the train. The locomotive, by design, responds to a directional command as indicated by the polarity of its internal trainline wires. The orientation of the trailing locomotive however, does not change the connection pattern, and reversing the orientation of a trailing unit automatically swaps the polarity of its trainline wires to maintain the correct direction of travel.

The arrangement according to the invention provides an absolute directional reference which must be defined manually on the control locomotive. The invention assumes certain conventions will be adopted. However, if such conventions are adopted, the invention provides a methodology for establishing a universal, unambiguous forward and reverse directional reference for controlling and trailing locomotives, including remotely located slave locomotives anywhere in the train. The methodology comprises assigning of an unambiguous identification for each of the two trainline wires in each car and locomotive, assigning a corresponding first male and first female terminal contact to one trainline wire in each car and locomotive, and assigning a corresponding second female and second male contact to the other trainline wire in each car and locomotive such that each wire has a male terminal contact and a female terminal contact at each end. A first polarity is assigned to a first wire of said two wires in the control locomotive and a second polarity is assigned to the second wire in the control locomotive such that reversal of the orientation of any car or locomotive swaps the polarity of the first and second wires. As a result, the correct directional reference unambiguously is assigned to each car and locomotive.

While there has been described what is considered to be an exemplary embodiment, the invention should be apparent to those skilled in the art and various changes and modifications may be made therein without departing from the invention, and it is intended in the claims to cover such changes and modifications as fall within the true spirit and scope of the invention.

I claim:

1. A method for establishing universal and unambiguous forward and reverse directional reference for trailing locomotives and railroad cars each having a pair of first and second wires forming a two wire electrical trainline under the control of a control locomotive comprising the steps of:

assigning an unambiguous identification for each of the two wires in each car or locomotive;

assigning a corresponding first male and first female terminal contact to opposite ends of the first wire in the forward direction;

assigning corresponding second female and second male contact to opposite ends of second wire in the reverse direction such that the wires are paired with a male terminal contact and a female terminal contact at each end;

assigning a first polarity to the first wire of said two wires in the control locomotive and a second polarity to a second wire in said locomotive such that reversal of the orientation of any car or locomotive swaps the polarity of its wires thereby maintaining correct directional reference.

2. The method according to claim 1, wherein the unambiguous identification of the two wires comprises assigning to at least one of said wires a direction of travel for the locomotive in accordance with a specified polarity and gender of the selected terminal contact associated with said wire.

3. An apparatus for establishing an unambiguous forward and reverse directional reference in a train of railroad vehicles under the control of a control locomotive having a two wire electrical trainline with first and second wires for each vehicle, said first wire having a male and female contact at opposite ends and said second wire having a male and female contact at opposite ends in a reverse sense from the first wire; said first wire of the control locomotive being polarized in use to a first polarity and second wire being polarized to an opposite polarity such that the polarity of the male contact at the front of the control locomotive is carried to the corresponding male contact at the front of any succeeding vehicle and the polarity of the female contact at the front of the control locomotive is carried to the corresponding female contact at the front of any succeeding vehicle such that the trainline polarity of all the vehicles in the train corresponds to the control locomotive when oriented in correspondence therewith and the reversal of the orientation of any vehicle swaps the polarity of the wires therein to thereby maintain correct directional reference.

4. Apparatus in accordance with claim 3 further comprising a detector responsively coupled to the train line and operative for establishing a direction of travel of the locomotive in accordance with a specified polarity of said train line, and a selected gender of the terminal contact associated with said wire.

5. The apparatus in accordance with claim 3 further comprising a detector responsively coupled to the train line polarity representative of the orientation of the locomotive and responsive to a coded input signal representative of the direction of travel for the locomotive, said detector for producing the first output for operating the locomotive in accordance with said signal and for producing the second output indicative of an opposite direction of travel for the locomotive when the polarity of the trainline is reversed.

6. The apparatus according to claim 4, wherein the first and second wires are paired with a connector with one each of the male and female contacts.

7. The arrangement of claim 4, wherein each connector in each vehicle has a male and female contact connected to a corresponding wire, in a sense opposite to the corresponding connector at the opposite end of the vehicle.

8. A method for establishing universal and unambiguous forward and reverse directional reference for trailing locomotives and railroad cars each having a pair of first and second wires forming a two wire electrical trainline under the control of a control locomotive comprising the steps of:

assigning an unambiguous identification for each of the two wires in each car or locomotive;

assigning a corresponding first male and first female terminal contact to respective opposite ends of the first wire in the forward direction;

assigning corresponding second male and second female terminal contact to respective opposite ends of second wire in an opposite sense to the first wire such that the first and second wires are paired with a male terminal contact and a female terminal contact at each end;

assigning a first polarity to the first wire of said two wires in the control locomotive and a second polarity to a second wire in said locomotive such that reversal of the orientation of any car or locomotive swaps the polarity of its wires thereby maintaining correct directional reference.

9. The method of claim 8, wherein the unambiguous identification of the two wires comprises assigning to at least one of said wires, a direction of travel for the locomotive in accordance with a specified code and gender of the selected terminal contact associated with the wire.

* * * * *